United States Patent Office 3,834,991
Patented Sept. 10, 1974

3,834,991
COLORIMETRIC ASSAY FOR LYSOZYME
Robert E. Megraw, St. Louis, Mo., and Judith C. Woodson, Randolph, N.J., assignors to Warner-Lambert Company, Morris Plains, N.J.
No Drawing. Filed May 23, 1972, Ser. No. 256,073
Int. Cl. C12k 1/04
U.S. Cl. 195—103.5 R        13 Claims

ABSTRACT OF THE DISCLOSURE

A suspension of dyed *Micrococcus lysodeikticus* cells is used as the substrate in a novel, colorimetric assay for lysozyme in body fluids. To obtain the substrate, dried *Micrococcus lysodeikticus* cells are treated with a reactive dye, and all unreacted dye is removed upon repeated washing with water. A buffered, aqueous suspension of the dyed cells is incubated with a fluid test sample containing an unknown quantity of lysozyme. Cell lysis yields a solution of dyed fragments of *Micrococcus lysodeikticus* cells, the absorbance of which provides a measure of lysozyme concentration in the test sample.

BACKGROUND OF THE INVENTION

Lysozyme is a globulin found in tears, mucous secretions, leukocytes, egg albumin, certain micro-organisms and many plants. It is known to exert a strong antiseptic action due to lysis of bacteria.

Recently, there has been an increased awareness of the need for the accurate determination of lysozyme levels in serum and urine: serum levels are important for the detection of renal disease as well as for the detection of specia forms of anemias and lukemias, and the early detection of radiation sickness in patients with tumors undergoing X-ray and gamma radiation treatment; urinary levels of lysozyme have also been found to be valuable in the early detection of kidney transplant rejections, renal tumors, various renal diseases and certain forms of leukemia.

Most methods for the determination of lysozyme in body fluids now in use are based on the original observations of Fleming described in *Proc. Roy. Soc.*, London, Series B, *93*: 306-317, 1922: the lysozyme in body tissues and secretions, such as tears, was found to lyse part or all of a full-grown plate culture of *Micrococcus lysodeikticus* within a certain period of time. Assay methods based on these findings measure the rate of decrease in turbidity of a suspension of killed *Micrococcus lysodeikticus* cells to which a fluid containing an unknown concentration of lysozyme has been added. E. H. Boasson, in *J. Immunol.*, *34*: 281, 1938, describes an optical density method for determining lysozyme activity: the decrease in density from the time lysozyme is added to a bacterial suspension of *Micrococcus lysodeikticus* to a given time (60 minutes or more) is observed. H. Fraenkel-Conrat measured the turbidimetric rate of lysis of a *Micrococcus lysodeikticus* suspension over a three minute period at intervals of 30 seconds. (*Archives of Biochemistry*, *27*: 109, 1950). In a more recent publication, G. Litwack describes an accurate photometric method for measuring the lysis of suspensions of *Micrococcus lysodeikticus* by lysozyme, wherein it is possible to reproduce activities in 60 seconds after the addition of the enzyme; moreover, a linear relationship between 30 and 60 second determinations may be consistently reproduced (*Proc. Soc. Exp. Biol. Med. 89*: 401-403, 1955).

While all of the above mentioned procedures for the determination of lysozyme represent certain advances in clinical chemistry, certain disadvantages are evident. For example, in turbidimetric procedures, spectrophotometric measurements of the decrease in turbidity are relatively inaccurate and, therefore, quantitation of results is limited. In addition, any insoluble contaminating protein present would be dispersed throughout the sample during measurements and would interfere with turbidimetric procedures. In all prior are procedures, samples must be tested individually, which is quite time consuming. Furthermore, with turbidimetric procedures, linear results are obtained for only a relatively short period of time, i.e., for about three minutes, which makes it difficult to reproduce results with any degree of accuracy.

Thus it can be seen that there is a real need for a sensitive, accurate, and rapid method for determining lysozyme concentration in body fluids which can be used with relative ease by clinical laboratory personnel on numerous samples.

SUMMARY OF THE INVENTION

This invention relates to *Micrococcus lysodeikticus* cells dyed with a reactive dye and the use of this novel product as a substrate in a procedure for assaying lysozyme concentration in body fluids. The substrate is prepared by suspending dried *Micrococcus lysodeikticus* cells and the reactive dye in an alkaline medium; when dying is complete, the pH of the reaction mixture is adjusted to 6.5 to 8.0, and all unreacted dye is removed by repeated washing with water. The dyed cells obtained are resuspended in water and buffered with an 0.2M to 1.0M sodium phosphate buffer for use in the assay procedure of the invention. The buffered substrate may be lyophilized for preservation and reconstituted with distilled water for use in the assay. In an alternate procedure, the purified, dyed cells in an aqueous suspension may be lyophilized, and the pH adjustment made and the buffer added, after reconstitution, prior to assaying for lysozyme. To perform the assay, the suspension of the substrate, buffered to a pH of 6.5 to 8, is incubated with a fluid test sample for a predetermined period of time, depending on the origin of the sample being tested. The reaction is stopped by adjusting the pH to 1.4 by the addition of a suitable mineral acid. A water soluble, nonionic emulsifier is added, and the mixture is centrifuged to separate the unlysed dyed cells, which precipitate out, from the clear supernatant solution which contains dyed fragments and/or free dye from the lysed *Micrococcus lysodeikticus* cells as a result of the action of lysozyme. The lysozyme concentration in the fluid test sample is a linear function of the optical density of this supernatant fluid.

DESCRIPTION OF THE INVENTION

We have now found that dried *Micrococcus lysodeikticus* cells can be dyed with a certain class of textile dyes which is commonly known as the "reactive dyes." Furthermore, the dyed *Micrococcus lysodeikticus* cells, from which all "free" or chemically unreacted dye has been removed, provide a suitable substrate for use in a novel colorimetric assay for lysozyme, according to the method of this invention.

The *Micrococcus lysodeikticus* cells suitable for use in preparing the dyed substrate of this invention are obtained from a nutrient agar slant culture No. 19 of the Waksman Collection, by either of the two following methods. The cells of *Microccccus lysodeikticus* may be grown on a solid medium containing 0.5% Bacto-peptone, 0.5% sodium chloride, 0.1% yeast extract, and 2% agar, at 37° C. for 48 hours. In an alternate procedure, *Micrococcus lysodeikticus* cells may be grown out in a liquid medium containing 0.5% Bacto-peptone, 0.5% sodium chloride, 0.3% beef extract, and 0.1% yeast extract, at 30° C. for 48 to 72 hours. The cells produced are washed once with about 60 times the cell volume with distilled water, followed by centrifugation at 20° C. and 3,000 revolutions per minute. This washing process is then repeated, using three washings with cold acetone and two washings with cold ether, and carrying out the centrifugation at 0° C. Final drying to obtain *Micrococcus lysodeikticus* cells in the form of a fine yellow powder is achieved by air and suction on sinter glass funnels. The dried cells may be stored in a desiccator at 5° C. or in a freezer, and have been found to be easily resuspended for further reactions to prepare the novel dyed substrate of this invention.

Suitable reactive dyes for preparing the dyed *Micrococcus lysodeikticus* cells are widely used for dyeing cellulosic textiles. In general, they have the following structural formulas:

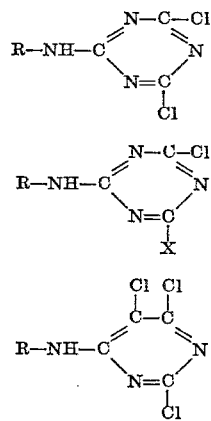

wherein R is a chromophor derived from the various classes of dyestuffs such as the azo, complex metal azo, anthraquinone, phthalocyanine, dioxazine, or formazyl dyestuffs (optionally containing a sulfo group): and X is halogen or an inactive radical which may contain a solubilizing group.

The reactive groups of these dyestuffs contain at least one substituent which, under fixing conditions, splits off as an anion. The reactive group can consist, for example, of the radical of a cyclic carbimide halide which contains at least one mobile halogen atom bound to a carbon atom in the ring which is adjacent to a tertiary ring nitrogen atom. The reactive group can consist, in particular, of an azine ring of aromatic character which contains at least two tertiary ring nitrogen atoms and at least one mobile halogen atom bound to ring carbon adjacent to such nitrogen atoms such as, e.g. chlorine or bromine; examples of such reactive groups are mono-, di- or tri-halogen diazinyl or mono- or di-halogen triazinyl groups. Reactive dyes are widely described in the literature, for example, in U.S. Pat. Nos. 2,820,785; 2,889,316; 2,891,941; 2,892,828; 2,979,498; 3,054,795; 3,036,058; 3,149,100; 3,127,232 and the like. Moreover, these dyes are commercially available from a number of sources, including Ciba Inc. ("Cibracron"), Imperial Chemical Industries Limited (as "Procion"), Farbwerke Hoechst A.G. (as "Remazol") Sandoz-Wander, Inc. (as "Drimarene") and Ciba-Geigy Corporation (as "Reactone").

In the preferred embodiment of this invention, the dye sold commercially by Geigy under the trade name Reactone Red 2B is used to dye the *Micrococcus lysodeikticus* cells. This dye is reported in the literature (Ackermann and Dussy in Melliand's Textilber. Vol. 42, page 1167, 1961) to have the following structure:

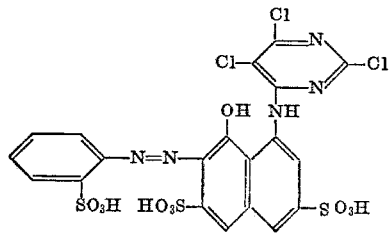

The dyed *Micrococcus lysodeikticus* cells are prepared by suspending equal amounts of the dried *Micrococcus lysodeikticus* cells and the reactive dye to be used in a 0.75 to 2.0N alkaline solution (preferably 1.25N), and allowing the solution to stand overnight. The temperature and the duration of the reaction, as well as the amounts of dried cells and reactive dye, may all be varied to a considerable extent to yield the desired dyed cells of this invention. However, it has been found to be most convenient to conduct the dying reaction at room temperature (about 20° C. to 30° C.) overnight (from about 16 hours to about 24 hours) using approximately 5.5% to 15% (preferably 8%) by weight, based on the total weight of the reaction mixture of *Micrococcus lysodeikticus* cells and an equal amount of reactive dye.

When the dying reaction is complete, the dyed cells can be separated from all unreacted dye by washing the product, which is not soluble in water, several times with distilled water, i.e., until the wash water is substantially clear of dye color. The dyed cells thus obtained may be resuspended for use in the lysozyme assay or lyophilized and reconstituted for future use.

It has been found that optimum lysozyme activity is achieved in a specific pH range, i.e., between pH 6.5 and pH 8, preferably between pH 6.5 and pH 7.2, and most preferably at pH 7.0. Therefore, the suspension of dyed *Micrococcus lysodeikticus* cells must be brought to the proper pH prior to running the assay. Additionally, since the above stated pH range is important, it is most desirable that it be maintained during the assay by means of the inclusion of a suitable buffer. While the pH adjustment and the buffering of the substrate suspension may be performed at any time prior to the actual lysozyme determination it has been found preferable, in terms of product preparation, to adjust the pH prior to the removal of the unreacted dye from the dyed cell reaction mixture. The buffering of the suspension of the dyed cell substrate is preferably done prior to lyophilization. Thus, the lyophilized substrate, when reconstituted with water, yields an aqueous suspension of the substrate, buffered to the required pH, which can be used directly for the assay with no additional preparation on the part of laboratory personnel.

Adjustments in pH can be made by the addition of various mineral acids such as hydrochloric acid, nitric acid, sulfuric acid, phosphoric acid, and the like. Of these, 6N hydrochloric acid has been found to be most suitable for making the pH adjustment in the suspension of dyed *Micrococcus lysodeikticus* cells.

Suitable buffers which have been found useful for maintaining the pH of the substrate suspension between 6.5 and 8 include [bis - (2 - hydroxyethyl)]amino - tris - (hydroxymethyl)methane with hydrochloric acid (commonly known as Bis-Tris-HCl buffer) and monobasic sodium phosphate with dibasic sodium phosphate (commonly known as sodium phosphate buffer). Concentrations of from 0.2M to 1M, preferably 0.5M, have been found to be particularly effective in maintaining the proper pH during lysozyme determination. The sodium phosphate buffer is preferred.

In the most preferred embodiment of this invention, the dyed *Micrococcus lysodeikticus* cells are prepared by suspending 8% by weight of Reactone Red 2B, based on the total weight of the reaction suspension, in a 1.25N sodium hydroxide solution. This suspension is allowed to stand overnight, at room temperature. The dyed cells obtained are then neutralized to a pH of 7 with 6N hydrochloric acid and washed with distilled water until the wash water is substantially free of dye color. The wash water is discarded and the resulting dyed cells, which contain only chemically bound reactive dye, are then resuspended in distilled water to which is added a 0.5M sodium phosphate buffer, and the product is lyophilized. This lyophilized substrate may be easily reconstituted with distilled water for the assay of lysozyme according to the method of this invention.

In carrying out the assay according to the practice of this invention, from 0.5 to 2 ml. of an aqueous suspension containing from 5.5 to 15% by weight of the dyed *Micrococcus lysodeikticus* cells are incubated with a small amount of lysozyme containing fluid sample (from about 0.05 to about 0.5 ml.). The suspension of dyed *Micrococcus lysodeikticus* cells should be at a pH of from 6.5 to 8, preferably at a pH of 6.5 to 7.2, and most preferably at a pH of 7.0 for optimum lysozyme activity.

The incubation is conducted for a predetermined period of time: from 5 to 60 minutes, preferably 15 to 30 minutes, and most preferably for 30 minutes. As indicated, the incubation time may be varied considerably, but a uniform period of time must be used for a single series of tests, i.e. the unknown being tested, the reference standard, and the blank. It has been found that very short incubation times provide sufficient sensitivity of elevated levels of lysozyme, but are of relatively poor sensitivity for low levels of lysozyme. Hence, higher incubation times should be used for testing urine samples, where levels of lysozyme are normally nonexistent or negligible since even low levels would be considered as some indication of a malfunction. Correspondingly, for serum determinations, the shorter incubation times would be sufficiently accurate for use.

After the predetermined incubation period, the reaction is stopped by the addition of a sufficient amount of an acid ingredient to bring the pH of the reaction mixture to at least 1.4. Acids suitable for this purpose include the mineral acids such as hydrochloric acid, nitric acid, sulfuric acid, phosphoric acid and the like. Of these, 0.1N hydrochloric acid is particularly suitable for stopping the reaction.

It has also been found advantageous to add, along with the acid ingredient which stops the incubation, a water soluble, nonionic emulsifier, in order to solubilize dispersed proteins which may be present in the sample being tested.

Generally, the emulsifiers suitable for the above-mentioned purpose are prepared by reacting a fatty alcohol with ethylene oxide to form a polymer containing repeating oxyethylene groups. Preferred water soluble emulsifiers of this type include polyoxyethylene lauryl ethers containing from 4 to 23 oxyethylene groups; polyoxyethylene cetyl ether containing 20 oxyethylene groups; and polyoxyethylene oleyl ether containing 20 oxyethylene groups.

Among these, a polyoxyethylene lauryl ether having 23 oxyethylene groups is particularly preferred. A product of this type is sold commercially by Atlas Chemical Industries, Wilmington, Del. under the trade name "Brij 35."

As an example of additional nonionic emulsifiers which have also been found suitable for use in the novel assay of this invention, there may be mentioned ethoxylated tridecyl alcohol. Typical of the latter emulsifier is one sold commercially by Drew Chemical Corporation, New York, N.Y., under the trade name "Lipal 610."

For ease of operations, the emulsifier ingredient may be mixed with the acid ingredient prior to addition to the incubating reaction mixture; concentrations of from 0.1% to 1.5% by volume, based on the total volume of the acid/emulsifier mixture are used. Amounts of emulsifier may be varied considerably depending upon the particular emulsifier chosen.

For example, when using the polyoxyethylene fatty ethers, 0.1% to 0.5%, by volume, based on the total volume of the acid/emulsifier combination, should be used. In a particularly preferred embodiment, 2% by volume of a polyoxyethylene lauryl ether (such as Brij 35) is used in combination with 0.1N hydrocholric acid solution. With the ethoxylated tridecyl alcohol emulsifiers, 0.25% to 1.5%, by volume, based on the total volume of the acid/emulsifier combination should be used.

After the incubation has been stopped by the addition of the acid/emulsifier solution, the dye released through the action of the lysozyme on the dyed *Micrococcus lysodeiktious* cells is separated from the unlysed dyed cells by centrifugation. As a measure of lysozyme activity, the optical density of the clear, colored, supernatant is read, at the approximate wave length for the free dye used against a reagent blank.

Results obtained with the novel substrate and assay of this invention are more sensitive than prior art methods. Colorimeteric measurement is a much more sensitive procedure than prior art methods which measure in turbidity. Furthermore, in the instant invention, absorbance is read at a particular wave length for a specific dye. In addition, the results obtained with the assay of the instant invention are linear, thus providing a more accurate and an easier method of determining concentrations.

Moreover, it is quite surprising that reactive dyes, normally substantive to cellulosic textiles, can be chemically coupled with dried *Micrococcus lysodeikticus* cells, considering the diverse composition of the dried cells.

Additionally, it was unexpected that the dyed cells would be destroyed by lysozyme in a similar fashion to the untreated cells. Further, one could not reasonably predict that free dye would be released during cell lysis, in the amounts which could be directly correlated with the concentration of lysozyme. The discovery of these factors forms the basis for the preparation of the novel dyed substrate of this invention and its use for lysozyme assay by colorimetric means: the depth of color of the released dye can be measured colorimetrically against a known standard to provide a simple, accurate, and rapid method for determining lysozyme concentrations in fluid samples.

In order to illustrate the present invention, the following examples are given:

EXAMPLE 1

Preparation of Dyed *Micrococcus Lysodeikticus* Cells 50 grams of dried *Micrococcus lysodeikticus* cells are suspended in one liter of 1.25 N sodium hydroxide solution, with constant stirring. 50 grams of Geigy's Reactone Red No. 2B dye are added to the aqueous suspension of the cells, with constant stirring, until completely dissolved. The batch is covered and allowed to stand at room temperature (23° C. to 26° C.) for about 18 to 24 hours (overnight). The pH of the batch is adjusted to 7, by first adding about 187.50 ml. of 6N hydrochloric acid, and then using a pH meter to monitor the addition of minor amounts of 1N HCl (about 6.2 ml. are required) to make the final pH adjustment. The suspension of dyed cells is then centrifuged to separate dyed cells from unreacted dye. To remove all remaining unreacted dye from the dyed cells, the cells are washed and centrifuged after each washing, until the supernatant obtained is substantially free of dye color. Approximately 8 washings are required. The final supernatant is discarded and 125 ml. of distilled deionized water is added to the purified, dyed *Micrococcus lysodeikticus* cells. To this suspension there is added 1500 ml. of 0.5M sodium phosphate buffer solution (pH 7). The buffered suspension of dyed substrate obtained is ready for use in the lysozyme assay of Example 4. Alternately, 2 ml. portions of the dyed cell suspension can be placed in 10 ml. vials to which are added 10 ml. of the 0.5M sodium phosphate buffer. The buffered suspension of the dyed cells is then lyophilized for two days. The product obtained may be stored at 4° C. until ready for use.

EXAMPLE 2

Preparation Of The Acid/Emulsifier Combination 20 grams of polyoxyethylene lauryl ether having 23 oxyethylene groups is dissolved, with heating, in 500 ml. of distilled deionized water. The solution is cooled to room temperature and brought to 1 liter. 10 ml. of this emulsifier solution is combined with a sufficient amount of 0.1N hydrochloric acid to provide a final volume of 200 ml. of the acid/emulsifier combination.

EXAMPLE 3

Preparation Of The Acid/Emulsifier Combination 20 ml. of ethoxylated tridecyl alcohol is dissolved in 1 liter of distilled water. 10 ml. of this emulsifier solution is combined with 190 ml. of 0.1N hydrochloric acid to provide a final volume of 200 ml. of the acid/emulsifier combination.

EXAMPLE 4

Determination Of Lysozyme Concentrations 1 ml. of the buffered substrate suspension of Example 1 is incubated in a water bath at 37° C. for about two minutes in order to raise the temperature of the substrate to that of the water bath. 0.2 ml. of test sample is added and incubation is conducted at 37° C. for exactly 30 minutes. The test tube is removed from the water bath and 2.0 ml. of the acid/emulsifier combination of Example 2 is added. The test tube is then centrifuged for 10 minutes. The resultant precipitate is removed and the optical density of the supernatant solution is determined at a wave length of 540 nm. A blank assay and a reference standard are run in the same manner. The amount of dye released into the supernatant is proportional to the concentration of lysozyme in the test sample; concentrations of lysozyme present are readily calculated from values obtained with known standards.

EXAMPLE 5

Determination Of Lysozyme Concentrations 1 ml. of the buffered substrate suspension of Example 1 is incubated in a water bath at 37° C. for about two minutes in order to raise the temperature of the substrate to that of the water bath. 0.2 ml. of test sample is added and incubation is conducted at 37° C. for exactly 30 minutes. The test tube is removed from the water bath and 2.0 ml. of the acid/emulsifier combination of Example 3 is added. The test tube is then centrifuged for 10 minutes. The resultant precipitate is removed and the optical density of the supernatant solution is determined at a wave length of 540 nm. A blank assay and a reference standard are run in the same manner. The amount of dye released into the supernatant is proportional to the concentration of lysozyme in the test sample; concentrations of lysozyme present are readily calculated from values obtained with known standards.

What is claimed is:

1. A composition for the determination of lysozyme concentration in body fluids comprising an aqueous suspension of a purified, dyed *Micrococcus lysodeikticus*, prepared by:
   1. Reacting in alkaline solution dried *Micrococcus lysodeikticus* cells with a reactive dye selected from a group consisting of:

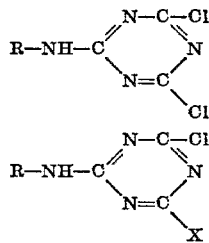

I

II and

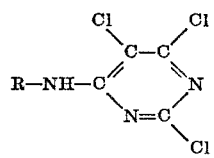

III wherein R is a chromophor selected from the group consisting of azo, complex metal azo, anthraquinone, phthalocyanine, dioxazine, formazyl dyestuffs and formazyl dyestuffs containing a sulfo group; and X is a halogen atom, to produce a reaction mixture;
   2. Neutralizing the reaction mixture; and
   3. Removing all unreacted dye to obtain dyed cells containing only chemically united dye;

said suspension being buffered to maintain a pH of from 6.5 to 8.

2. A composition according to Claim 1 wherein the aqueous suspension of dyed *Micrococcus lysodeikticus* cells is buffered to maintain a pH of 6.5 to 7.2.

3. A composition according to Claim 2 wherein the reactive dye has the formula:

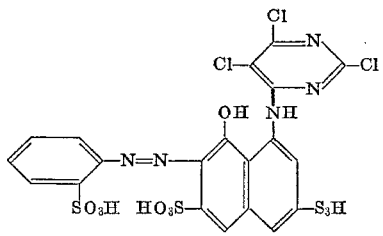

4. A composition according to Claim 3 wherein there is used, as the buffer, a 0.2M to 1M sodium phosphate buffer.

5. A composition according to Claim 4 wherein the dyed *Micrococcus lysodeikticus* cells are present in the aqueous suspension in an amount of from 5.5% to 15% by weight, based on the total weight of the aqueous suspension.

6. A lyophilized composition of Claim 1.

7. A lyophilized composition of Claim 5.

8. A composition according to Claim 5 wherein the dyed *Micrococcus lysodeikticus* cells are present in the aqueous suspension in an amount of about 8% by weight, based on the total weight of the aqueous suspension, and the aqueous suspension is buffered to a pH of about 7, with a 0.5M sodium phosphate buffer.

9. A lyophilized composition of Claim 8.

10. A method for the determination of lysozyme concentration of a fluid sample which comprises:

A. Incubating a mixture of the fluid sample with an aqueous suspension of purified, dried *Micrococcus lysodeikticus* cells, buffered to maintain a pH of 6.5 to 8 for a predetermined period of time; said dried *Micrococcus lysodeikticus* cells being dyed with a reactive dye selected from the group consisting of:

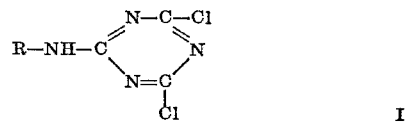

I

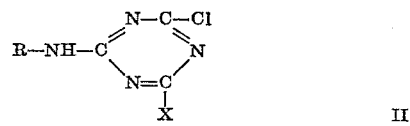

II and

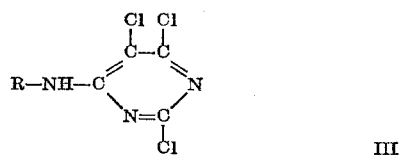

III wherein R is a chromophor seelcted from the group consisting of azo, complex metal azo, anthraquinone, phthalocyanine, dioxazine, formazyl dyestuffs and formazyl dyestuffs containing a sulfo group and X is a halogen atom;

B. Adding to suspension A, at the end of the incubation time, a combination of a mineral acid and a water soluble, nonionic emulsifier, said acid being present in an amount sufficient to impart a pH of at least 1.4 to the incubating suspension, and cause the precipitation of all unlysed, dyed *Micrococcus lysodeikticus* cells;

C. Removing all unlysed, dyed *Micrococcus lysodeikticus* cells by centrifugation; and D. Determining lysozyme concentration in a fluid sample by measuring the optical density of the remaining supernatant fluid.

11. A method according to Claim 10 wherein the aqueous suspension of dyed *Micrococcus lysodeikticus* cells are buffered to maintain a pH of 6.5 to 7.2.

12. A method according to Claim 11 wherein 0.1N hydrochloric acid is added in Step B.

13. A method according to Claim 11 wherein the water-soluble, nonionic emulsifier is a polyoxyethylene lauryl ether having 23 oxyethylene groups.

References Cited

UNITED STATES PATENTS

| | | | |
|---|---|---|---|
| 3,694,318 | 9/1972 | Klein | 195—103 SR |
| 3,679,661 | 7/1972 | Babson | 195—103.5 R X |

OTHER REFERENCES

Fernley: "Biochem, J." *87*:90–95 (1963).

Sumner et al.: "The Enzymes," vol. I, Part 2, pp. 772, 790 (1951).

Rinderknecht et al.: Clin. Chim. Acta" *21*:197–203 (1968).

"Chemical Abstracts" *46*:11322 (1952).

DAVID M. NAFF, Primary Examiner

U.S. Cl. X.R.

195—59

UNITED STATES PATENT OFFICE
CERTIFICATE OF CORRECTION

Patent No. 3,834,991     Dated September 10, 1974

Inventor(s) Robert E. Megraw and Judith C. Woodson

It is certified that error appears in the above-identified patent and that said Letters Patent are hereby corrected as shown below:

Column 8, in Claim 3, the portion of the formula reading

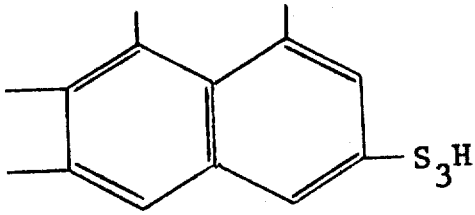         should read         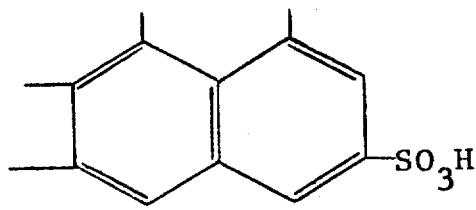

Signed and sealed this 31st day of December 1974.

(SEAL)
Attest:

McCOY M. GIBSON JR.
Attesting Officer

C. MARSHALL DANN
Commissioner of Patents